(12) United States Patent
Cao et al.

(10) Patent No.: US 8,175,911 B2
(45) Date of Patent: May 8, 2012

(54) SYSTEM AND METHOD FOR INFERRING AND VISUALIZING CORRELATIONS OF DIFFERENT BUSINESS ASPECTS FOR BUSINESS TRANSFORMATION

(75) Inventors: Rong Zeng Cao, Beijing (CN); Wei Ding, Beijing (CN); Shun Jiang, Beijing (CN); Juhnyoung Lee, Yorktown Heights, NY (US); Chun Hua Tian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 12/243,851

(22) Filed: Oct. 1, 2008

(65) Prior Publication Data

US 2010/0082696 A1    Apr. 1, 2010

(51) Int. Cl.
*G06Q 10/00* (2012.01)
(52) U.S. Cl. ............ 705/7.36; 705/7.11; 705/7.12; 705/7.38; 705/348
(58) Field of Classification Search ........ 705/7.11–7.28, 705/7.36–7.38, 348; 717/100–105
See application file for complete search history.

(56) References Cited

U.S. PATENT DOCUMENTS

| | | | | |
|---|---|---|---|---|
| 5,737,494 A * | 4/1998 | Guinta et al. | ........ | 706/47 |
| 5,918,232 A * | 6/1999 | Pouschine et al. | ........ | 1/1 |
| 5,946,694 A * | 8/1999 | Copeland et al. | ........ | 1/1 |
| 6,011,559 A * | 1/2000 | Gangopadhyay et al. | ..... | 345/440 |
| 6,023,578 A * | 2/2000 | Birsan et al. | ........ | 717/105 |
| 6,119,149 A | 9/2000 | Notani | | |
| 6,161,101 A * | 12/2000 | Guinta et al. | ........ | 706/45 |
| 6,212,530 B1 * | 4/2001 | Kadlec | ........ | 1/1 |
| 6,292,830 B1 * | 9/2001 | Taylor et al. | ........ | 709/224 |
| 6,332,130 B1 | 12/2001 | Notani et al. | | |
| 6,339,838 B1 * | 1/2002 | Weinman, Jr. | ........ | 717/104 |
| 6,411,936 B1 | 6/2002 | Sanders | | |
| 6,556,974 B1 * | 4/2003 | D'Alessandro | ........ | 705/7.32 |
| 6,601,233 B1 * | 7/2003 | Underwood | ........ | 717/102 |
| 6,789,252 B1 * | 9/2004 | Burke et al. | ........ | 717/100 |
| 6,919,910 B2 | 7/2005 | Chang | | |
| 6,928,436 B2 | 8/2005 | Baudel | | |

(Continued)

OTHER PUBLICATIONS

M. Ernest; J.M. Nisavic; "Adding value to the IT organization with the Component Business Model" IBM Systems Journal, vol. 46, No. 3, 2007.*

(Continued)

*Primary Examiner* — Lynda Jasmin
*Assistant Examiner* — Alan S Miller
(74) *Attorney, Agent, or Firm* — Scully, Scott, Murphy & Presser, P.C.; William Stock, Esq.

(57) ABSTRACT

A system and method for inferring and visualizing correlations of different business aspects for business transformation are provided. Business models, for instance, that may include business component model, business process model, value drivers and metrics model, application model, organization model, and solutions model are organized into a model topology data schema, and qualitative relationships and quantitative relationships may be configured among the entities or components of the business models. Correlations are inferred and visualized based on those relationships.

35 Claims, 9 Drawing Sheets

U.S. PATENT DOCUMENTS

| | | | |
|---|---|---|---|
| 6,954,758 B1* | 10/2005 | O'Flaherty | 707/802 |
| 6,965,868 B1* | 11/2005 | Bednarek | 705/7.14 |
| 7,117,161 B2 | 10/2006 | Bruce | |
| 7,136,827 B2 | 11/2006 | Eicher | |
| 7,162,427 B1 | 1/2007 | Myrick et al. | |
| 7,206,751 B2 | 4/2007 | Hack et al. | |
| 7,246,128 B2* | 7/2007 | Jordahl | 1/1 |
| 7,251,613 B2 | 7/2007 | Flores et al. | |
| 7,283,986 B2 | 10/2007 | Okunseinde et al. | |
| 7,308,414 B2* | 12/2007 | Parker et al. | 705/7.27 |
| 7,415,437 B2 | 8/2008 | Marvin et al. | |
| 7,503,032 B2* | 3/2009 | Bhaskaran et al. | 717/104 |
| 7,506,302 B2* | 3/2009 | Bahrami | 717/100 |
| 7,574,694 B2* | 8/2009 | Mangan et al. | 717/123 |
| 7,584,117 B2* | 9/2009 | Bubner | 705/7.36 |
| 7,593,012 B2 | 9/2009 | Ikehata et al. | |
| 7,605,813 B2 | 10/2009 | Uthe | |
| 7,617,177 B2* | 11/2009 | Bukary et al. | 1/1 |
| 7,668,855 B2 | 2/2010 | Hodgson et al. | |
| 7,693,738 B2* | 4/2010 | Guinta et al. | 705/7.32 |
| 7,885,841 B2 | 2/2011 | King | |
| 7,925,594 B2 | 4/2011 | Jaligama et al. | |
| 7,933,762 B2* | 4/2011 | Pinto et al. | 703/22 |
| 2001/0034628 A1* | 10/2001 | Eder | 705/7 |
| 2001/0049615 A1* | 12/2001 | Wong et al. | 705/8 |
| 2002/0099563 A1* | 7/2002 | Adendorff et al. | 705/1 |
| 2003/0004746 A1* | 1/2003 | Kheirolomoom et al. | 705/1 |
| 2004/0059611 A1 | 3/2004 | Kananghinis et al. | |
| 2004/0064436 A1* | 4/2004 | Breslin et al. | 707/1 |
| 2004/0078378 A1* | 4/2004 | Bala | 707/100 |
| 2004/0078777 A1* | 4/2004 | Bahrami | 717/105 |
| 2004/0143470 A1 | 7/2004 | Myrick et al. | |
| 2005/0065831 A1 | 3/2005 | Keay et al. | |
| 2005/0119922 A1* | 6/2005 | Eder | 705/7 |
| 2005/0154769 A1 | 7/2005 | Eckart et al. | |
| 2005/0171980 A1 | 8/2005 | Fernandez et al. | |
| 2005/0203784 A1 | 9/2005 | Rackham | |
| 2005/0246215 A1 | 11/2005 | Rackham | |
| 2006/0015424 A1 | 1/2006 | Esposito et al. | |
| 2006/0100947 A1 | 5/2006 | Cimral et al. | |
| 2006/0129419 A1 | 6/2006 | Flaxer et al. | |
| 2006/0178920 A1* | 8/2006 | Muell | 705/8 |
| 2006/0184412 A1 | 8/2006 | Kagan et al. | |
| 2006/0190544 A1 | 8/2006 | Chikirivao et al. | |
| 2006/0195373 A1 | 8/2006 | Flaxer et al. | |
| 2006/0229926 A1* | 10/2006 | Homann et al. | 705/9 |
| 2006/0241956 A1* | 10/2006 | Levy et al. | 705/1 |
| 2007/0021993 A1 | 1/2007 | Chandra et al. | |
| 2007/0022410 A1* | 1/2007 | Ban et al. | 717/136 |
| 2007/0027701 A1* | 2/2007 | Cohn et al. | 705/1 |
| 2007/0033211 A1* | 2/2007 | Berman et al. | 707/102 |
| 2007/0038465 A1* | 2/2007 | Jang et al. | 705/1 |
| 2007/0038501 A1* | 2/2007 | Lee et al. | 705/10 |
| 2007/0038502 A1 | 2/2007 | Kagan et al. | |
| 2007/0038627 A1 | 2/2007 | Cohn et al. | |
| 2007/0050232 A1 | 3/2007 | Chang et al. | |
| 2007/0106520 A1* | 5/2007 | Akkiraju et al. | 705/1 |
| 2007/0118551 A1* | 5/2007 | Akkiraju et al. | 707/102 |
| 2007/0136115 A1* | 6/2007 | Senturk Doganaksoy et al. | 705/7 |
| 2007/0162482 A1 | 7/2007 | Flaxer et al. | |
| 2007/0174109 A1 | 7/2007 | Cohn et al. | |
| 2007/0179822 A1 | 8/2007 | Benayon et al. | |
| 2007/0179825 A1 | 8/2007 | Dreiling et al. | |
| 2007/0203766 A1 | 8/2007 | Adler et al. | |
| 2007/0214025 A1 | 9/2007 | Jang et al. | |
| 2007/0245297 A1* | 10/2007 | Kuester et al. | 717/104 |
| 2007/0250373 A1* | 10/2007 | Ernest et al. | 705/10 |
| 2007/0265864 A1 | 11/2007 | Chess et al. | |
| 2007/0271277 A1* | 11/2007 | Ivan et al. | 707/100 |
| 2007/0279416 A1* | 12/2007 | Cobb et al. | 345/440 |
| 2008/0004924 A1 | 1/2008 | Cao et al. | |
| 2008/0033888 A1* | 2/2008 | Flaxer et al. | 705/36 R |
| 2008/0172273 A1 | 7/2008 | Rackham | |
| 2008/0177622 A1 | 7/2008 | Akkiraju et al. | |
| 2008/0313596 A1 | 12/2008 | Kreamer et al. | |
| 2009/0006150 A1 | 1/2009 | Prigge et al. | |

OTHER PUBLICATIONS

Juhnyoung Lee and Anca-Andreea Ivan "Value-Centric, Model-Driven Business Transformation" CEC-EEE '06 Proceedings of The 8th IEEE International Conference on E-Commerce Technology and The 3rd International Conference on Enterprise Computing, E-Commerce and E-Services, IEEE Computer Society, Washington, DC ISBN 0-7695-2511-3.*

Thomas Li, Wei Ding, Chunhua Tian, Rongzeng Cao, Shunxiang Yang, and Jun Zhu "Continual Business Transformation Technology" International Federation for Information Processing, vol. 205, Research and Practical Issues of Enterprise Information Systems, eds. Tjoa, A.M., Xu, L., Chaudhry, S., (Boston:Springer), pp. 85-95.*

Pentapalli, A Comparative Study of Roth-Erev and Modified Roth-Erev Reinforcement Learning Algorithms for Uniform-Price Double Actions, Iowa State University, 2008.

Brown et al., Treemap 97, 1997, Retrieved from http://otal.umd.edu/Olive/Class/Trees.

Cable et al., Project Portfolio Earned Value Management Using Treemaps, Project Management Institute Research Conference, Jul. 2004.

Johnson et al., Tree-Maps a Space-Filling Approach to the Visualization of Hierarchical Information Structures, IEEE CH3046-09100000284, 1991.

Jungmeister et al., Adapting Treemaps to Stock Portfolio Visualization, University of Maryland, Institute for System Research, Nov. 1992.

North et al., Snap-Together Visualization—Coordinating Multiple Views to Explore Information, HCIL Technical Report 99-10, May 1999.

Shneiderman, Discovering Business Intelligence Using Treemap Visualizations, Beyey Network, Apr. 2006.

Shneiderman, Tree Visualization with Tree-Maps—A 2-D Space-Filling Approach, University of Maryland, 1991.

Songer, Multidimensional Visualization of Project Control Data, Construction Innovation, 4, 173-190, 2004.

Office Action dated Oct. 11, 2011 received in related U.S. Appl. No. 12/243,872.

Office Action dated Jun. 23, 2011 received in related U.S. Appl. No. 12/243,898.

Office Action dated Jul. 5, 2011 received in related U.S. Appl. No. 12/243,811.

Microsoft Office Project Server 2007, 2006 Microsoft Corporation, http://download.microsoft.com/download/e/b/9/eb9e67aa-ae8c-4cc4-aad8-9e352f92c28c/ProjectPortfolioServer2007ProductGuide.doc.

Microsoft Office Project Portfolio Server 2007 Optimizer, https://www.am.ohio.gov/PortfolioServer/Manuals/MOPPS-Optimizer.pdf.

Balzer et al, Voroni Treemaps for the Visualization of Software Metrics, Association for Computing Machinery Inc., 2005.

Bederson et al., Ordered and Quantum Treemaps Making Effective use of 2D Space to Display Hierarchies, Institute of Advanced Computer Studies, College Park, MD, ACM, 2002.

Bladh, Step Tree, A File System Visualizer, Thesis No. MSC-2002-3, Department of Software Engineering and Computer Science, Blekinge Institute of Technology, Sweden, 2002.

Hodgson, Squarified Treemaps in XAML and C sing Microsoft Longhorne, the Code Project, 2002.

Heat Map, http://en.wikipedia.org/wiki/Heat_map.

Office Action dated May 20, 2011 received in related U.S. Appl. No. 12/243,872.

Office Action dated Jun. 29, 2011 received in related U.S. Appl. No. 12/243,891.

U.S. Office Action mailed Dec. 16, 2011 received in related U.S. Appl. No. 12/243,898.

U.S. Office Action mailed Dec. 22, 2011 received in related U.S. Appl. No. 12/243,811.

* cited by examiner

Inferring

Inferring & backward Inferring

Inferring

Inferring & backward Inferring

SYSTEM AND METHOD FOR INFERRING AND VISUALIZING CORRELATIONS OF DIFFERENT BUSINESS ASPECTS FOR BUSINESS TRANSFORMATION

CROSS-REFERENCE TO RELATED APPLICATIONS

This application is related to U.S. patent application Ser. No. 12/243,811 entitled, "SYSTEM AND METHOD FOR FINANCIAL TRANSFORMATION," U.S. patent application Ser. No. 12/243,872 entitled, "SYSTEM AND METHOD FOR DETERMINING TEMPERATURE OF BUSINESS COMPONENTS FOR FINDING BUSINESS TRANSFORMATION OPPORTUNITIES," U.S. patent application Ser. No. 12/243,891 entitled, "SYSTEM AND METHOD FOR FINDING BUSINESS TFANSFORMATION OPPORTUNITIES BY ANALYZING SERIES OF HEAT MAPS BY DIMENSION," U.S. patent application Ser. No. 12/243,898 entitled, "SYSTEM AND METHOD FOR FINDING BUSINESS TRANSFORMATION OPPORTUNITIES BY USING A MULTI-DIMENSIONAL SHORTFALL ANALYSIS OF AN ENTERPRISE," filed on even date and assigned to the same assignee in the present application, contents of which are incorporated by reference herein in their entirety. This application is also related to U.S. patent application Ser. No. 12/164,582 entitled, "SYSTEM AND METHOD FOR PLATFORM-INDEPENDENT, SCRIPT-BASED APPLICATION GENERATION FOR SPREADSHEET SOFTWARE," filed on Jun. 30, 2008 and assigned to the same assignee of the present application, contents of which are incorporated by reference herein in its entirety.

FIELD OF THE INVENTION

The present disclosure relates generally to computer applications, and more particularly to inferring and visualizing correlations of different business aspects for business transformation.

BACKGROUND OF THE INVENTION

Business transformation is a key management initiative that attempts to align people, process and technology of an enterprise closely with its business strategy and vision. Business transformation is often achieved by taking a holistic look at various dimensions of an enterprise such as business models, management practices, business processes, organizational structure and technology and optimizing them with best-practice or differentiated methods to reach a strategic end state. For example, business transformation in the enterprise finance area would, among others, optimize financial processes such as accounts receivables, eliminate non-value-added tasks, improve efficiency and productivity of people, and reduce errors by using technologies. Business transformation is considered an essential part of the competitive business cycle.

Consulting service companies in the business transformation area brand technology and consulting as their core product and service offerings. These offerings include models, methods and tools devised for facilitating business transformation. While the state-of-the-art business transformation consulting models and methods are useful, there are a number of general problems that need to be addressed to make them more effective. First, the current approaches are often limited in scalability because they demand subject matter experts to work with a variety of disconnected data, tools, templates and other assets. It is often cumbersome and difficult to streamline the data gathering and management manually. Data and documents often reside in multiple folders distributed among several machines. Consistency checking across data can only be done manually, and the process requires experts. It is not easy to capture a structured thinking process without a tool, which enforces the process or method. Information and knowledge not captured systematically is often difficult to disseminate and reuse effectively. Assets such as knowledge, models and methods are not necessarily managed. For example, more often than not, there is no version control put in place, and updating the assets consistently across the board becomes a daunting task. Multiple views with scattered documents having multiple views such as a process view, metrics view, component view, resource view, etc. are difficult to visualize. This in turn makes it difficult to link up upstream and downstream analysis.

Business transformation is related to earlier efforts and studies in Business Process Reengineering, Business Process Redesign, Business Process Change Management, Business Process Management, and Enterprise Architecture. Business process reengineering (BPR) is a management approach aiming at improvements by means of elevating efficiency and effectiveness of the processes that exist within and across organizations. In BPR, organizations look at their business processes from an unbiased perspective and determine how they can best construct these processes to improve how they conduct business. In 1990s, process reengineering was adopted at an accelerating pace. The early BPR methodologies were rooted in IT-centric BPR solutions. One such model, Process Reengineering Life Cycle approach outlines an iterative application of the following steps: (1) envision new processes, (2) initiating change, (3) process diagnosis, (4) process redesign, (5) reconstruction, and (6) process monitoring. While useful in specific cases, the methodologies did not address issue of scalable applications from the practitioner's viewpoint. There are few tools or information technology that comprehensively facilitates the BPR methodology, and users are left with primitive means for practicing the methodology.

Business Process Management (BPM) is an emerging field of knowledge and research at the intersection between management and information technology, encompassing methods, techniques and tools to design, enact, control, and analyze operational business processes involving humans, organizations, applications, documents and other sources of information. BPM differs from BPR in that it does not aim at one-off revolutionary changes to business processes, but at their continuous evolution. In addition, BPM usually combines management methods with information technology to make business transformation activities faster and cheaper. BPM systems monitor the execution of the business processes so that managers can analyze and change processes in response to data, rather than just a hunch. BPM allows the organizations to manage their processes as any other assets and improve and manage them over the period of time. The activities which constitute BPM life-cycle can be grouped into five categories: Process Design, Process Modeling, Process Execution, Process Monitoring, and Process Optimization.

Another related concept is Enterprise Architecture, which is the description of the current and future structure and behavior of an organization's processes, information systems, personnel and organizational sub-units, aligned with the organization's core goals and strategic direction. Although often associated strictly with information technology, it relates more broadly to the practice of business optimization in that it addresses business architecture, performance management, organizational structure and process architecture as well. The primary purpose of creating enterprise architecture is to ensure that business strategy and IT investments are aligned. As such, enterprise architecture allows traceability from the business strategy down to the underlying technology. The practice of enterprise architecture involves developing an architecture framework to describe a series of "current", "intermediate" and "target" reference architectures and applying them to align change within the enterprise. These frameworks detail all relevant structure within the organization including business, applications, technology and data. Each framework will provide a rigorous taxonomy and ontology that clearly identifies what processes a business performs and detailed information about how those processes are executed. While enterprise architecture is a key component of the information technology governance process at any organization of significant size, it also ideally relates broadly to the practice of business process management and optimization, because it addresses business architecture, performance management and process architecture as well.

U.S. Patent Publication 2005/0246215A1 discloses a system and method for alignment of an enterprise to component business model (CBM). This patent publication discloses creating a component business model of the enterprise in its current state and a component business model of a desired state, then comparing the two to identify the areas of improvement and change. The differences identified between the two are priortized for alignment with business objectives.

U.S. Patent Publication 2007/0027701 discloses a system and method for using component business model to organize an enterprise. This patent publication discloses how a component business model can be used to organize an enterprise. It describes identifying non-overlapping components of a business and then distinguishing them based on whether each component helps differentiate the business in the marketplace or if it provided standardized functions. One can analyze the attributes of each component and mark components as 'hot', meaning they might need to be optimized to align to the business objectives.

U.S. Patent Publication 2007/0174109 discloses a system and method for transforming an enterprise using a component business model. This patent publication describes a system and a method of using a CBM map for transforming an enterprise. Specifically, it discloses that industry standard CBM maps can be prepared ahead of time for each industry and that these can be retrieved from a repository and customized for each client's need. Components in a CBM can be rearranged based on the transformation strategy chosen. Special views can be enabled on a CBM map to query and focus on specific components related to a specific capability.

U.S. Patent Publication 2008/0033888 discloses a method and system for enterprise portfolio management based on component business model. This patent publication describes managing a portfolio of enterprise IT applications based on component business model. The idea is to help select a suitable set of IT transformation projects from among a larger set of IT transformation projects by conducting value analysis. This value analysis keeps the existing IT infrastructure of the client into account.

The above described patent publications, however, do not disclose or suggest identifying business transformation initiatives automatically, conducting a business case analysis of the transformation initiatives identified via component business modeling analysis, for instance, including return on investment (ROI) calculation, net present value (NPV) calculation, break-even analysis, internal rate of return (IRR), etc. Those publications also do not disclose or suggest, pre-populating the tool with various industry specific content (such as metrics, costs of transformations, etc.) based on past history, or providing what-if scenario analysis for evaluating several transformation initiatives, thereby facilitating the selection of best suited set of transformations from a portfolio of transformation choices possible. They also do not disclose or suggest automation of health measurement of each component by comparing the metrics associated with a component with those of industry benchmarks.

BRIEF SUMMARY OF THE INVENTION

A method and system for inferring and visualizing correlations of different business aspects for business transformation are provided. The method, in one aspect, may comprise loading into memory one or more business models. The business models may include at least business component model, business process model, value drivers and metrics model, application model, organization model, and solutions model. The method may also include selecting a model topology, the model topology representing data schema for connecting said one or more business models. The method may further include configuring one or more qualitative relationships between one or more entities in said business models, and configuring one or more quantitative properties of said one or more entities in said business models based on said configured one or more qualitative relationships. The method may still further include inferring one or more qualitative correlations from the said qualitative relationships among said one or more entities in said business models, the step of inferring utilizing one or more logical rules. The method may yet farther include determining quantitative correlations from said quantitative properties of said one or more entities, said determining utilizing statistics, data mining, mathematical models, simulations, optimizations, or combinations thereof, said quantitative correlations including distance, intensity, direction, or combinations thereof. The may include generating visualization of said qualitative correlations and quantitative correlations.

In another aspect, a method for inferring and visualizing correlations of different business aspects for business transformation may include providing a computer-implemented module operable to load into memory a plurality of business models. The plurality of business models may include at least business component model, business process model, value drivers and metrics model, application model, organization model, and solutions model. The plurality of business models may be structured using a model topology, the model topology representing data schema for connecting said plurality of business models. The method may also include providing a computer-implemented user-interface module operable to configure one or more qualitative relationships between one or more entities in said business models. The user-interface module may be further operable to configure one or more quantitative properties of said one or more entities in said business models based on said configured one or more qualitative relationships. The method may further include providing a computer-implemented inference engine operable to infer one or more qualitative correlations from the said qualitative relationships among said one or more entities in said business models, the inference engine utilizing one or more logical rules. The method may also include providing a computer-implemented module operable to determine quantitative correlations from said quantitative properties of said one or more entities, utilizing statistics, data mining, mathematical models, simulations, optimizations, or combinations thereof, said quantitative correlations including distance, intensity, direction, or combinations thereof; and providing a computer-implemented visualization module operable to generate visualization of said qualitative correlations and quantitative correlations.

A system for inferring and visualizing correlations of different business aspects for business transformation in one aspect may comprise a memory module operable to store a plurality of business models, said plurality of business models including at least business component model, business process model, value drivers and metrics model application model, organization model, and solutions model. The plurality of business models may be structured using a model topology, the model topology representing data schema for connecting said plurality of business models. A computer-implemented user-interface module may be operable to configure one or more qualitative relationships between one or more entities in said business models. The user-interface module may be further operable to configure one or more quantitative properties of said one or more entities in said business models based on said configured one or more qualitative relationships. A computer-implemented inference engine may be operable to infer one or more qualitative correlations from the said qualitative relationships among said one or more entities in said business models, the inference engine utilizing one or more logical rules. A computer-implemented module may be operable to determine quantitative correlations from said quantitative properties of said one or more entities, utilizing statistics, data mining, mathematical models, simulations, optimizations, or combinations thereof, said quantitative correlations including distance, intensity, direction, or combinations thereof. A computer-implemented visualization module may be operable to generate visualization of said qualitative correlations and quantitative correlations.

A program storage device readable by a machine, tangibly embodying a program of instructions executable by the machine to perform above-described methods may be also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
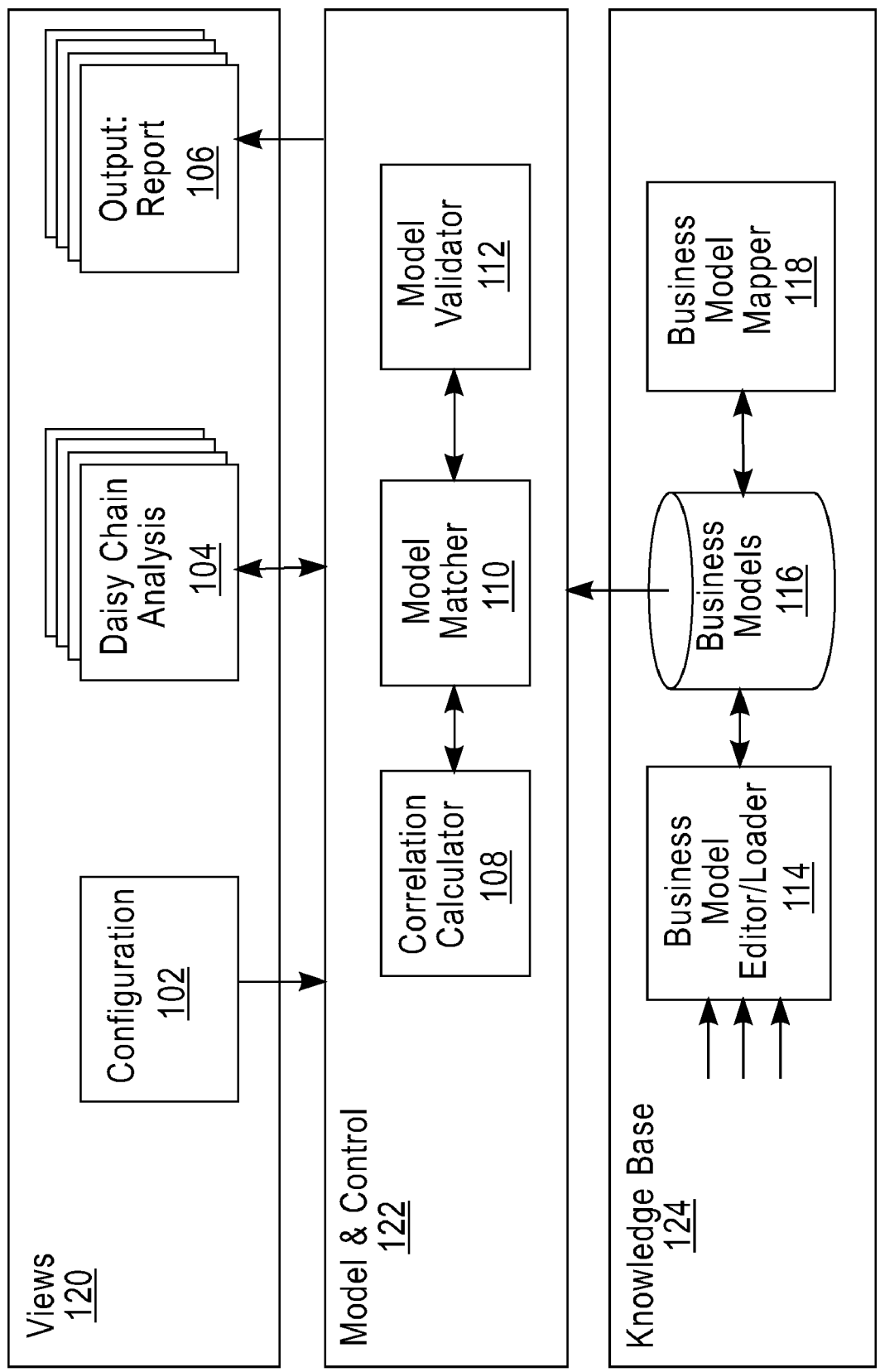
FIG. 1 is an architectural diagram illustrating functional components for inferring and visualizing correlations of different business aspects for business transformation in one embodiment of the present disclosure.

FIG. 1 is an architectural diagram illustrating functional components for inferring and visualizing correlations of different business aspects for business transformation in one embodiment of the present disclosure. The views aspect 120 may include functional components that allow users to configure desired views, provide analysis results and output reports. For example, a configuration component or module 102 enables users to configure the view of daisy chain analysis such as color coding, formatting, etc. A daisy chain analysis component or module 104 provides integrated views of business models (business component, business process, application, solution, organization, etc.) and enables to explore inference ("daisy-chain analysis") on the integrated views. The analysis result can be generated to one or more reports 106.

To enable such viewing and reporting capability, models and control 122 are used in one embodiment. A model matcher 110 may include an engine such as an inference engine to match the business models when a user selects items in one view. The model matcher 110, for instance, may receive correlation input from the Correlation Calculator 108. It shows the data to the user through a user interface, and allows the user to validate the offered correlations and make changes, if necessary, for example, qualitatively based on the user's domain knowledge and particular requirements. A correlation calculator 108 calculates the value of correlation based on the matching results. The correlation refers to a quantitative measure that indicates how strongly two or more entries in different models are related. In one embodiment, the quantitative analysis of correlation may be driven by data and one or more mathematical model such as a regression model. The correlation calculator 108, for instance using the regression model, and seemingly unorganized data about various elements in the business models as inputs to the regression model, discovers useful patterns in the data and indicates the patterns with quantitative measures such as "coefficient" between the elements, for example, a business process (e.g., account payable) and a business metric (e.g., debt).

A model validator component or module 112 checks and validates the model mapping. This module receives the input from the Model Matcher 110 of correlations among various elements of business models, for instance that are initially quantitatively calculated by one or more mathematical models, and then qualitatively adjusted by one or more subject matter experts. By applying logical rules or any other programmatic means, this module may ensure the integrity and consistency of the resultant correlation map among the business elements, by removing and/or adjusting inconsistent, contradictory relationships in the input.

Knowledge base level 124 may include various data and knowledge the model & control 122 uses in providing the views 120. For example, business models 116 store different business aspects that are correlated such as business component, business process, application, solution, organization, etc. User can edit or load the business models 116 through business model editor component or module 114, and map the correlation among these business models through business model mapper component or module 118.

Figure 2:
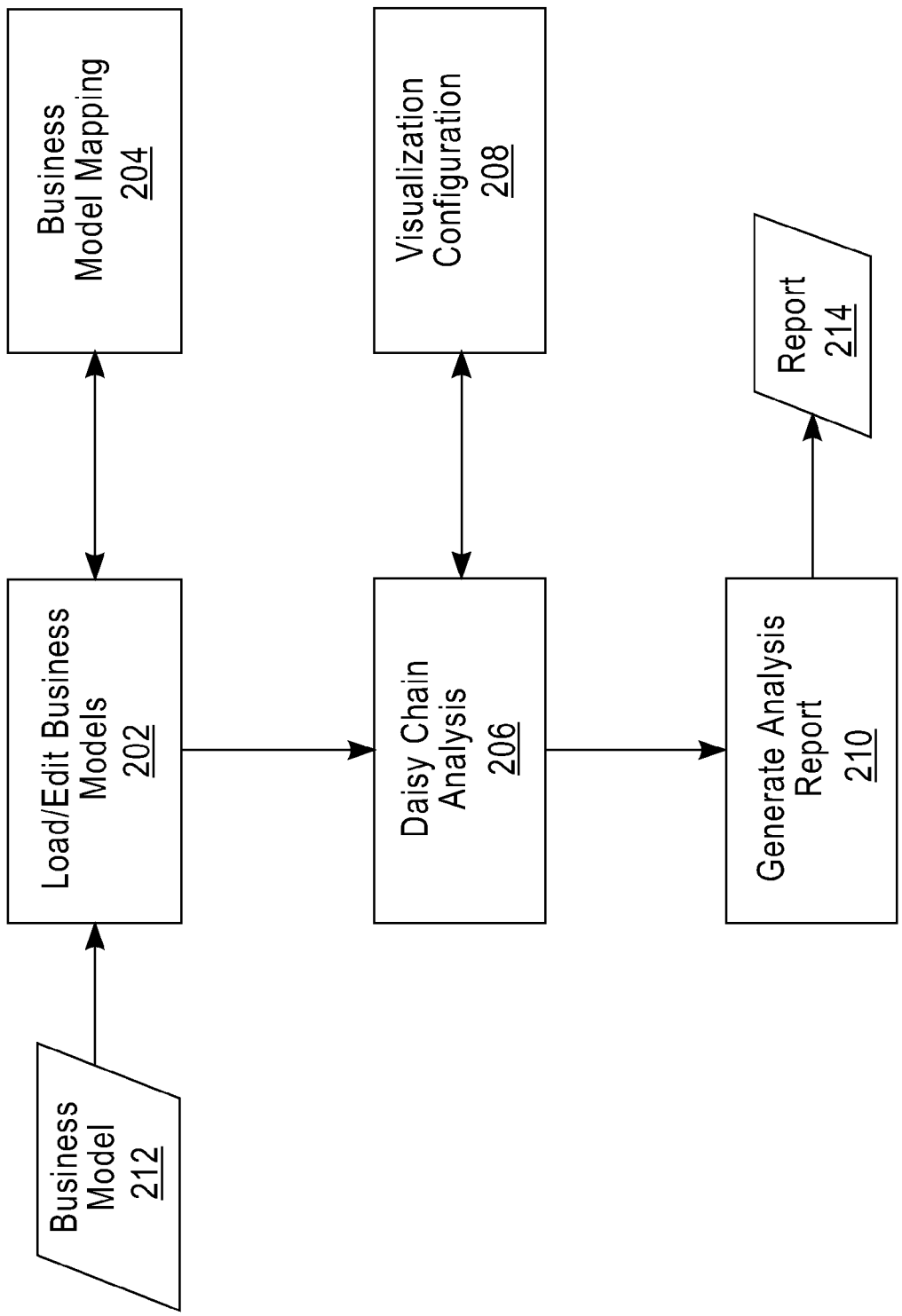
FIG. 2 is a flow diagram illustrating inferring and visualizing correlations in one embodiment of the present disclosure.

FIG. 2 is a flow diagram illustrating a method for inferring and visualizing correlations in one embodiment of the present disclosure. At 202, a user may input the one or more business models manually or load them from files and/or databases. Alternatively or additionally at 204, a user may map the correlation among the selected items of business models. For instance, the user such as subject matter experts in the field or like may use his or her domain knowledge to map the correlations at least initially. The scope and depth of the mapping activities may be further enhanced via the Model Matcher (FIG. 1, 110) as described above with reference to FIG. 1.

Referring to FIG. 2, at 206, daisy chain analysis is performed that infer the correlations among the models. In one aspect, the explicit mapping created at step 204 provides the input for inference at step 206, which discovers implicit relationships among business elements and logical rules, both basic and user-specific. The basic logical rules include transitive rules, symmetric rules, etc. For example, if the user at step 204 specifies explicitly that A is related to B and that B is related to C, the analysis at step 206 automatically infers an implicit relationship between A and C, by using the transitive rule. This particular rule is useful because when business models are represented hierarchically using a tree structure. All the parent-child relationships in a tree provide inputs to apply the rule. In another aspect, the user can add specific rules for inference, and the reasoning engine applies the rule in addition to the basic rules to infer further implicit relationships.

At 208, visualization options may be configured or provided with defaults. For instance, a user may set the configurations via a user interface. Alternatively or additionally, default values may be used. At 210, a report 214 may be generated that shows the results of the daisy chain analysis. The report 214 may be presented on the user interface, electronic documents such as spreadsheet worksheet, editable file, etc. The report 214 may be presented in various formats or layouts by default or as configured by a user.

Figure 3:
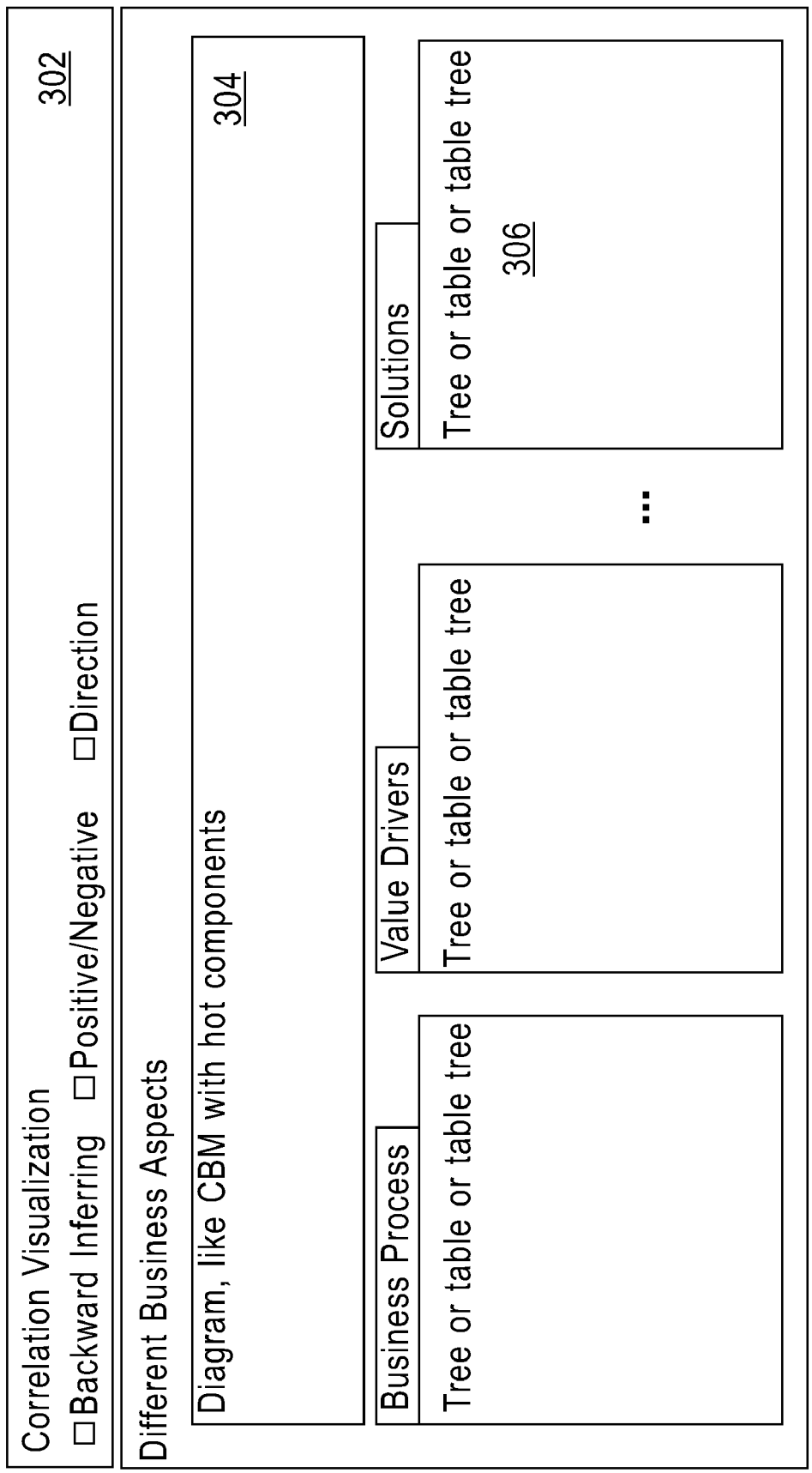
FIG. 3 is a diagram illustrating an example of a user interface screen shot showing a daisy chain analysis layout of in one embodiment of the present disclosure.
Figure 4B:
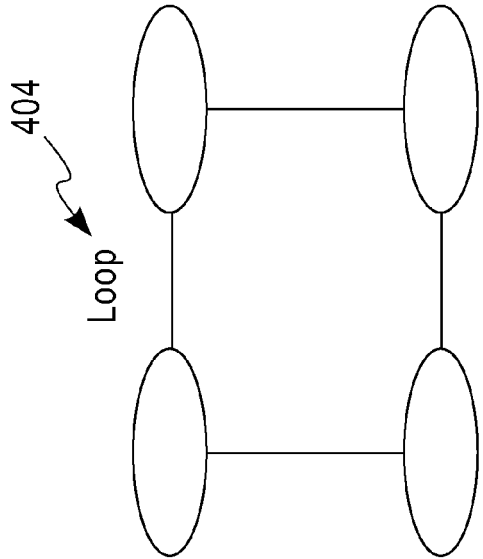
FIG. 4 is a diagram illustrating an example of a typical business model correlation topology in one embodiment of the present disclosure.
Figure 4D:
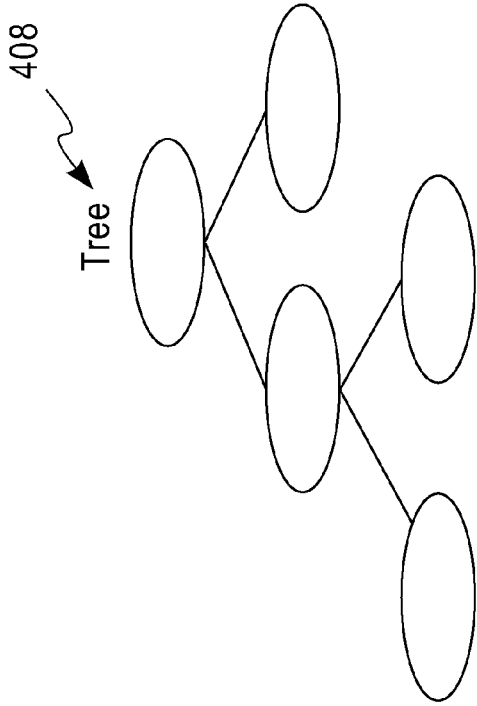
Figure 4A:
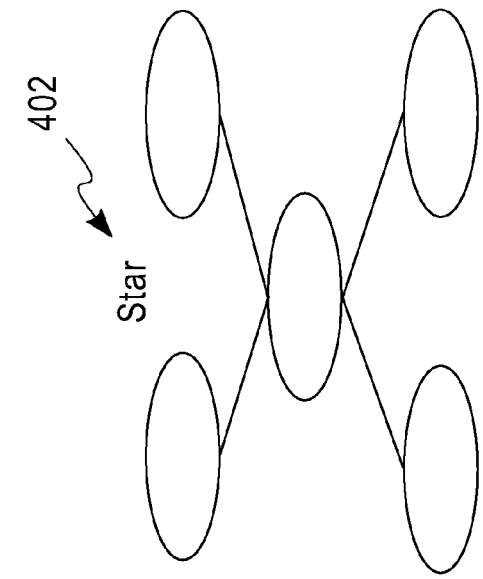
Figure 4C:
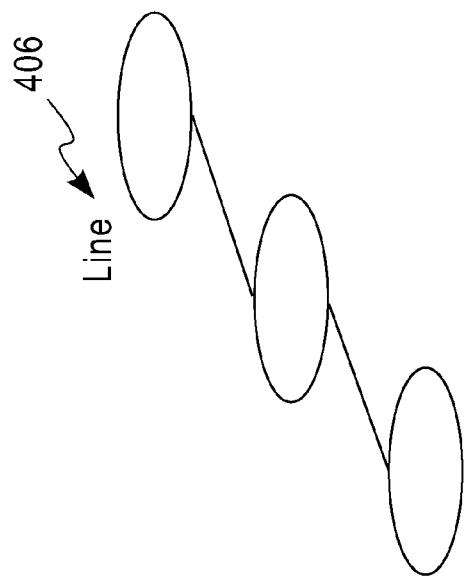

FIG. 3 is a diagram illustrating an example of a user interface screen shot showing a daisy chain analysis layout in one embodiment of the present disclosure. Correlation visualization 302 provides the configuration of the kind of dimension that will be visualized besides the value of correlation. The correlation configuration provides several options for users to select the visualization dimension, that is, what information will be visualized. In Correlation visualization 302 shown in FIG. 3, currently it lists 3 options, whether to show backward inferring information, whether to distinguish positive and negative correlation, and whether to point out the direction of the relationship, such as decrease or increase in strength of the relationship. For example, the default inferring is forward inferring, if the user selects a business process in the first tab, then the related applications will be highlight in the second tab. If the use check the "backward inferring" in 302, then, the first tab may also highlight other business processes, which are related with highlighted applications in the second tab. These processes may be shown in different colors. An area of the visualization, for example, shown at 304 may be used for diagrams like component business model. Another area or areas, for example, as shown in 306, may be used for views that show different aspects of business. These views can be trees, tables or table trees or combinations thereof, and may depend on specific business requirements or choice. The number of views can be configured by a user. A user can freely navigate business models and explore inference ("daisy-chai analysis") on the integrated views (304 and 306).

Shown at 306 are business process, value drivers, and solutions views. Business process view provides a hierarchical representation of a business process structure, e.g., APQC PCF (Process Classification Framework), SAP BPH (Business Process Hierarchy), or IBM EPF (Enterprise Process Framework). A business process may have multiple levels. For example, "8.0 Manage Financial Resources" is a business process. It may include multiple subgroups, i.e., 8.1, 8.2, . . . , and multiple levels, i.e., 8.0=>8.1=>8.1.1=>8.1.1.1. Value drivers view illustrates a hierarchical representation of Key Performance Indicators (KPI) of business processes. At the lowest level, it may provide business metrics that are used to measure the performance of low level business activities of the Business Process Hierarchy. They may include one or more attribute values such as one or more benchmark values and the business' current value. The low level metrics are grouped to one or more higher level indicators. At the highest level of the Value Driver tree, the indicators may be grouped into financial metrics of enterprises such as cost, revenue, profit, share value, etc. The Solutions view provides a hierarchical representation of solutions that may address identified shortfalls in business process, IT, data, and human organization. The solution may be software, services and their combinations. A solution does not have to be complete when offered. Instead, it may be composed and designed on demand to address a specific shortfall that is identified.

FIG. 4 is a diagram illustrating a typical business model correlation topology in one embodiment of the present disclosure. The correlation topology can guide the mappings of various business models, which is basis of daisy chain analysis. FIG. 4 shows four types of correlation topology as examples. Other topology may be used. In star topology shown at 402, all the correlation among business models is bridged by one business model. In a loop topology 404, the correlations and business models form a loop, each business model has one upward correlation and one forward correlation. In a line topology 406, except the start and end business model, each business model have one upward correlation and one forward correlation. In a tree topology 408, the correlations and business models form a tree.

FIG. 4 shows topology examples, which are types of data schema. The data schema defines the mapping logic. Before inputting data into the tool, the administrator or user or like may select or create one topology, which will automatically guide the follow up mapping. For example, if the user selects the star topology, "business process" is in the center, and other business models, like "application", "organization" and "value driver" are bridged by "business process". After selecting the topology, the user defines one application, and may select one or more of the related business processes, organizations, and/or value drivers. If the user selects the line topology, "business component" is linked to "business process", and "business process" is linked to "activity". In this topology, when the user defines a business component, then the user can select or define the related business processes; when the user defines a business process, then the user can select or define the related activities.

Figure 5:
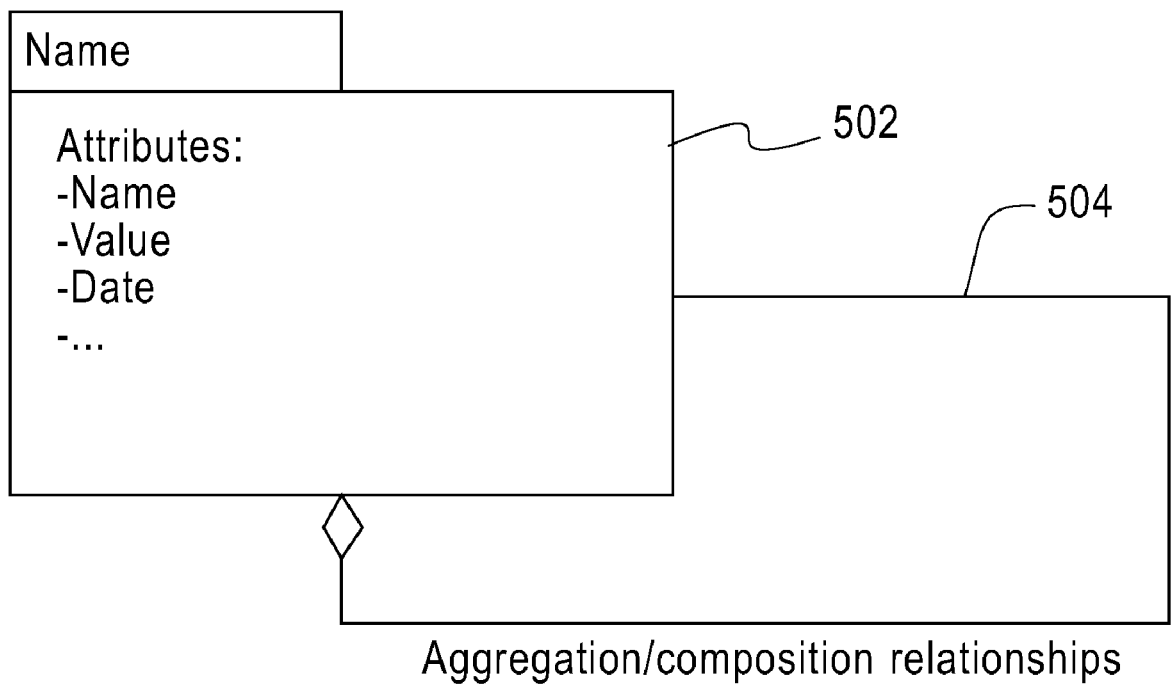
FIG. 5 is a diagram illustrating a model of business aspect in one embodiment of the present disclosure.

FIG. 5 is a diagram illustrating a model of business aspect in one embodiment of the present disclosure. A business model can be described by business model item 502 and its relationship 504 with other items, for instance, the parent business model item and child business model items. In 502, attributes are defined to describe the business model, such as name, value and corresponding date. The relationship 504 between two business model items is aggregation or composition relationship. Consider as an example a business process, "Account Opening" in banking application. The business process may include attributes such as "Time to open account", "Customer satisfaction", "audit failures", etc. "Account Opening" can be divided into "Teller Services", "Application Processing", "Customer Profile Management", "Account Maintenance", etc. sub-business process or child business processes. Business models may be created by users and/or by default from the model templates.

Figure 6:
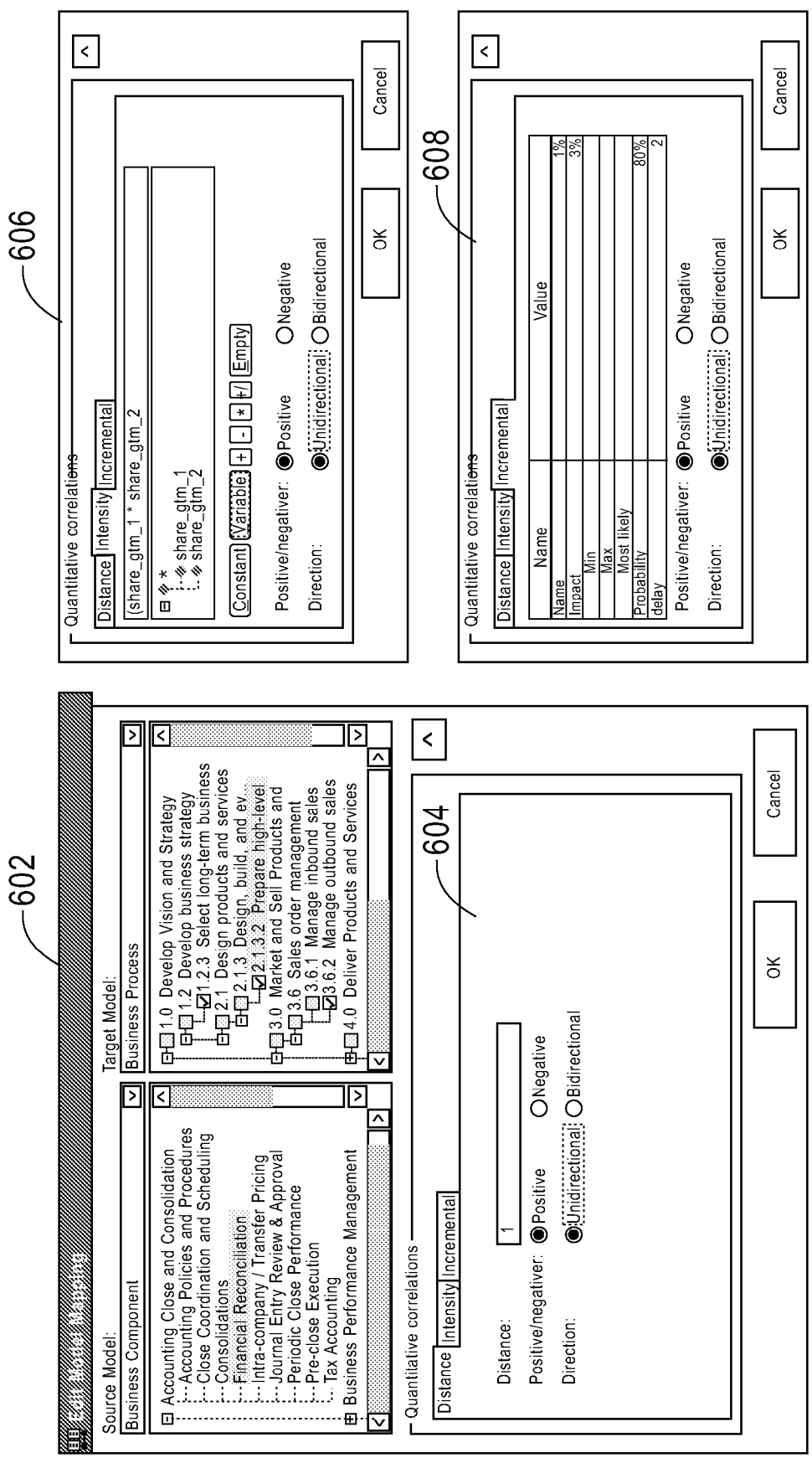
FIG. 6 illustrates an example of user interface screen shot that may be provided for business model mapping in one embodiment of the present disclosure.

FIG. 6 illustrates an example of user interface screen shot that may be provided for business model mapping in one embodiment of the present disclosure. Qualitative mapping 602 allows a user to create and modify association of business models. Via the user interface, the users may manually update (add, remove, modify) mappings between two different aspects (models) of business, for example, business components and business processes, as shown in the FIG. 6. The association created is used to analyze and infer both direct and indirect relationships among various models. It is called "Daisy-Chain Analysis." A user can select a source model in the pull-down list 610, and then can select a source model entry, and link it to one or more target model entries by using check-box 612. What kind of business model will be available in the source or target model list, how many nodes a user can select at a time, which level of the node can be selected may depend on the correlation topology used, the user's configuration and selection in the system through this and other user interfaces. The mappings in the present disclosure in one embodiment are bidirectional, meaning if A is mapped to B, and then B is mapped to A automatically. To avoid duplication in mapping, the target model may be fixed to Business Processes. Every model (source) may be mapped to a Business Process (target). However, in one embodiment, a Business Process is not mapped to any model manually. Instead that part is implied by the first mapping.

Qualitative correlation refers to the mapping between the source model and the target model manually mapped or linked by the user, for instance, using the "Edit Model Mapping" user interface shown in FIG. 6. In this correlation, the user may create mappings based on his or her domain knowledge and analysis requirements without providing any quantitative measures. Based on the qualitative correlation, a user can define the quantitative correlation. User interfaces such as those shown at 604, 606, 608 allow users to define or enter quantitative correlation, examples of which may include the distance, formula of intensity and incremental impact correlations. User interface 602 shows mapping relationships. For example, "Financial Reconciliation" business component is mapped to business process "1.2.3", "2.1.3.2", "3.6.2". This kind of mapping shows a qualitative relationship. The use can define the quantitative relationship in 604, 606 and 608 based on the mapping in 602. 604 defines the distance. For example, if an "application" directly supports an "organization", the distance is 0, otherwise the distance will be 1, 2, or more. 606 describes the intensity relationship. It uses a formula to describe the value of the relationship. For example, the intensity between an "application" and an "organization" can be defined as (total usage)/((number of people in the organization)*(duration)). In one or more business problems, quantitative formula among nodes is difficult to define because there is no empirical data for applying regression methods. 608 presents a technique referred to as "1% sensitivity analysis." The 1% sensitivity analysis is an incremental expression form to describe the impact of one business model (cause) on another business model. For example, if a metric, order process time is reduced 1%, the analysis captures how many percentages another metric, say, revenue, will be changed, which can be described in three values, that is most likely, minimum, and maximum. Beside the quantitative value, the use can also describe other attributes of the relationship in 604, 606, and 608, for example, is it a positive or negative impact? is it an unidirectional or bidirectional impact?

Figure 7:
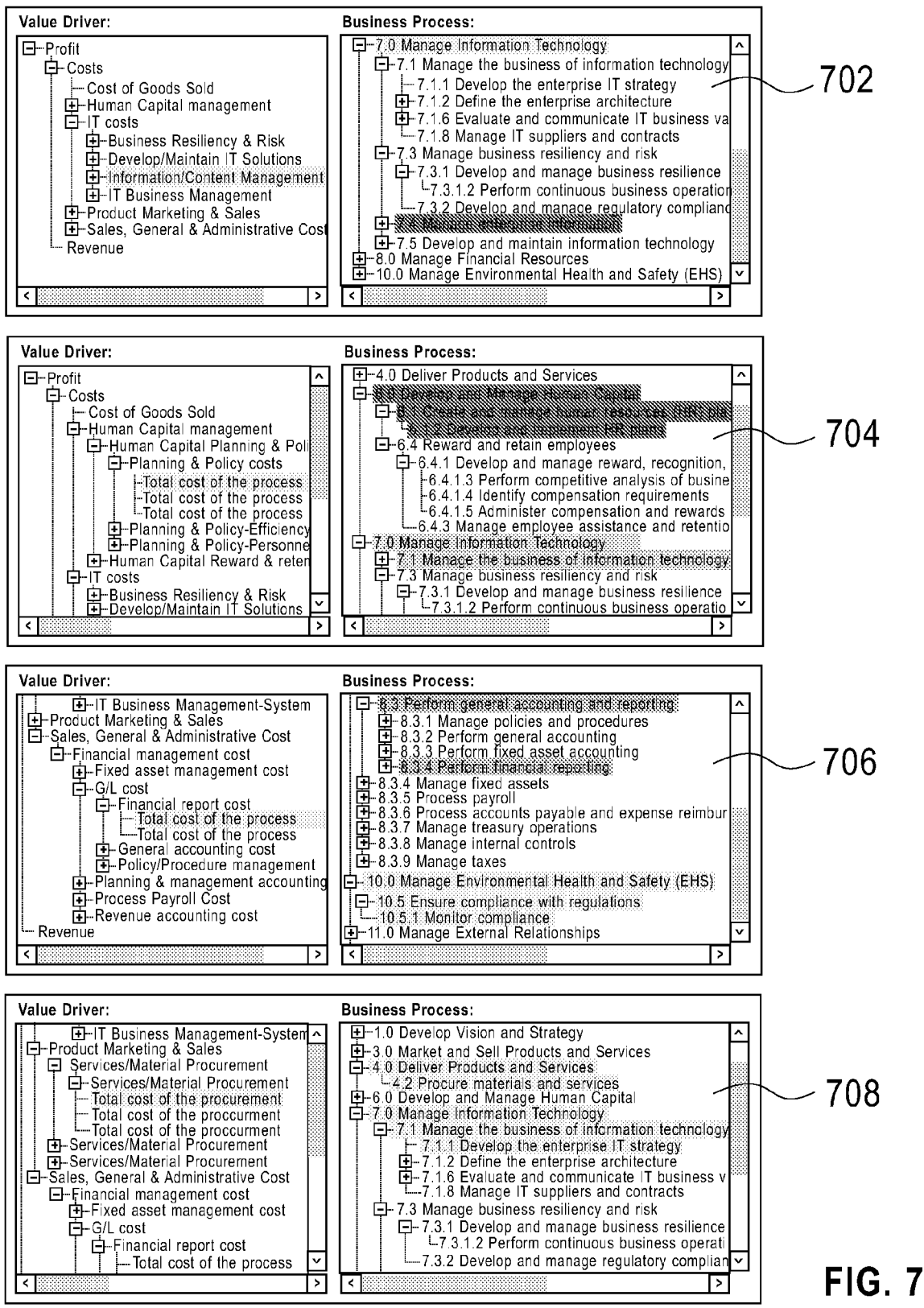
FIG. 7 illustrates examples of user interface screen shot that may be provided for business model mapping in one embodiment of the present disclosure.

FIG. 7 illustrates examples of user interface screen shots that may be provided for business model mapping in one embodiment of the present disclosure. The panel at 702 shows an example of using the brightness of color to describe distance of correlations. A bright color may show near correlation, while a dark color describes a long distance of correlations. The window shown at 704 is similar to 702, and uses the brightness of color to show the value of the intensity of correlations. In the pane shown at 706, different colors are used to show positive or negative of correlations. In the window shown at 708, same or different colors may be used to show direction of correlations.

Figure 8:
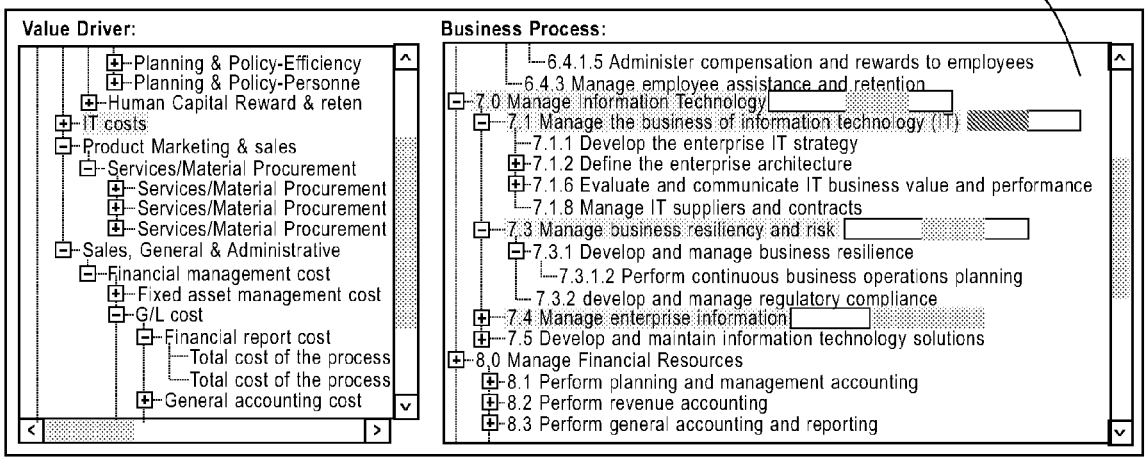
FIG. 8 illustrates examples of user interface screen shot that show color-coding extensions in one embodiment of the present disclosure.
Figure 8:
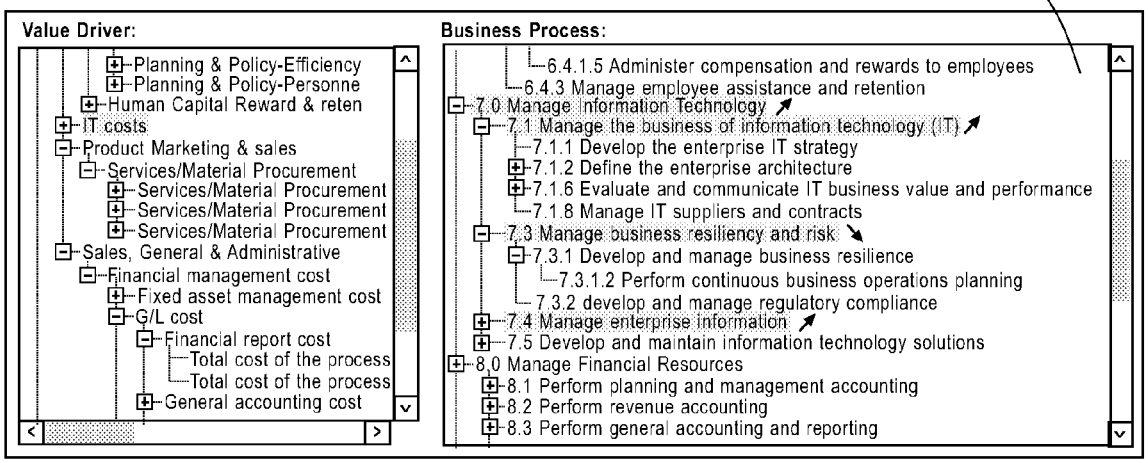
Figure 8:
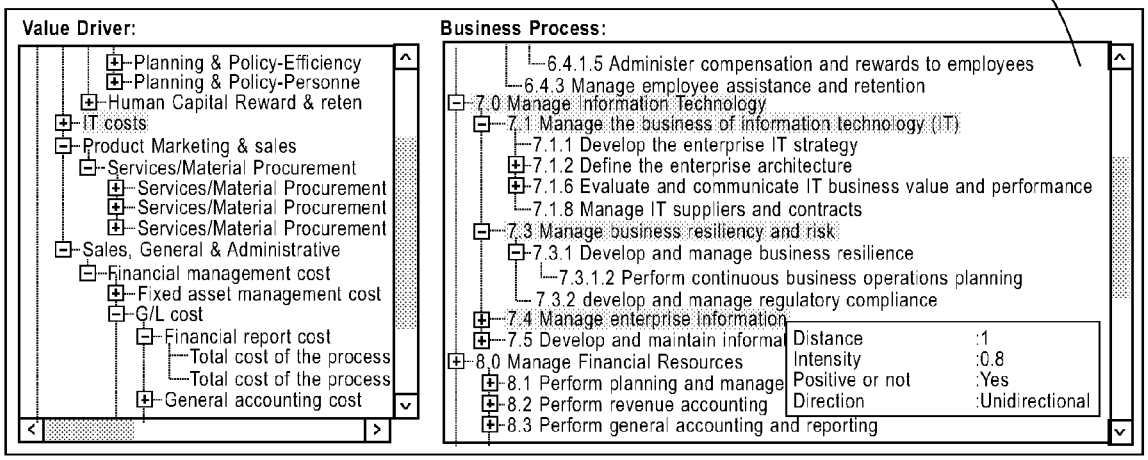

FIG. 8 illustrates examples of user interface screen shots that show color-coding extensions in one embodiment of the present disclosure. The window at 802 uses color bar to show the value of correlations besides the color coding. The window at 804 uses arrows to show the change or positive/negative correlations next to the color coding. The window at 806 provides a tag or an inset window to show the correlations information next to the color coding.

Figure 9:
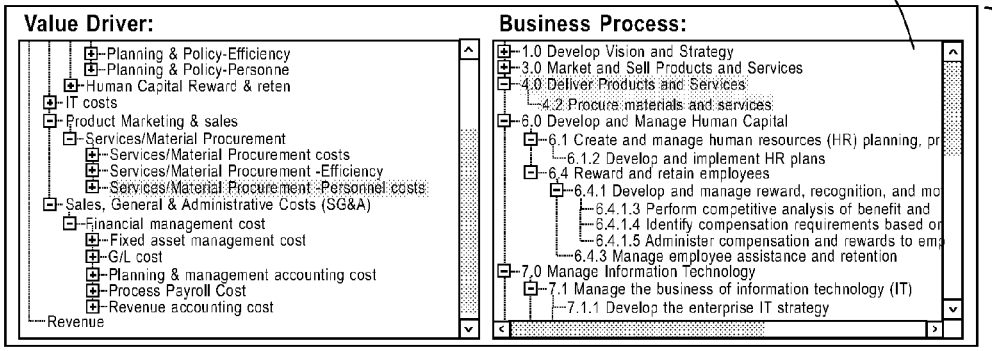
FIG. 9 illustrates examples of user interface screen shot that may be provided for inferring in one embodiment of the present disclosure.
Figure 9:
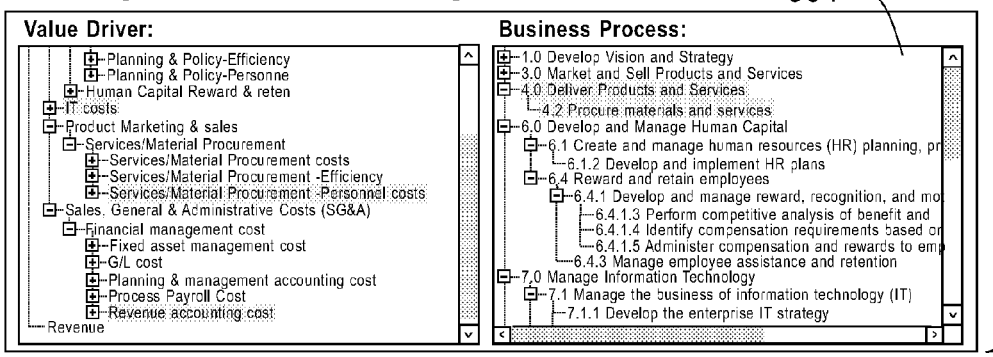
Figure 9:
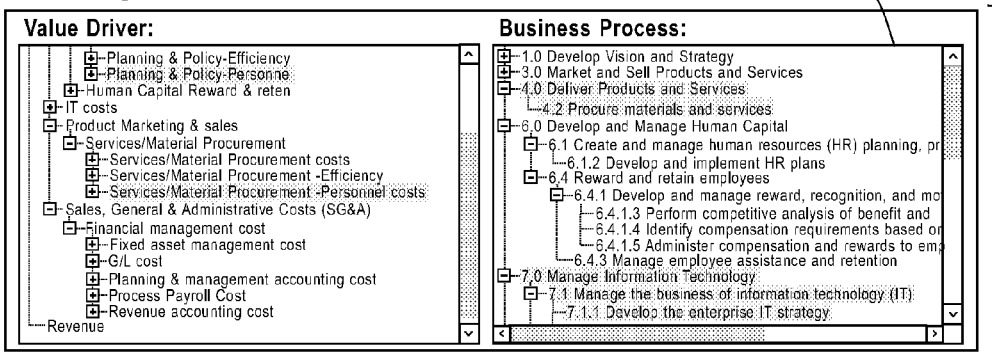
Figure 9:
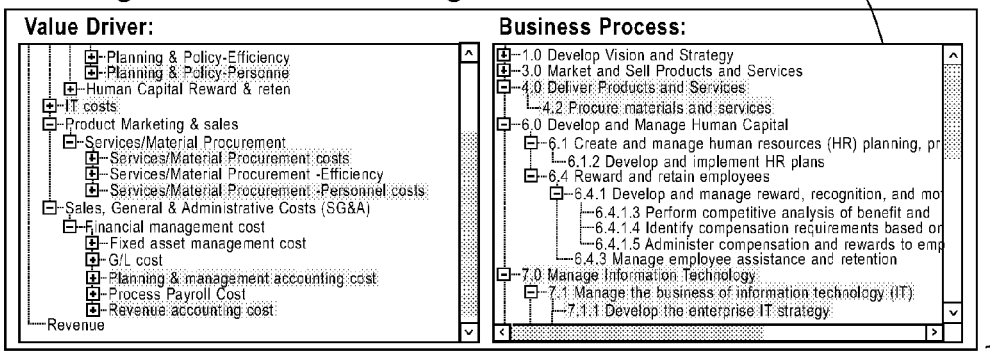

FIG. 9 illustrates examples of user interface screen shots that may be provided for inferring in one embodiment of the present disclosure. Two kinds of inferring are shown in FIG. 9: forward inferring and backward inferring. Screen shots 902 and 906 show forward inferring in 1:n and m:n scenarios. Screen shots 904 and 908 show backward inferring in 1:n and m:n scenarios. In backward inferring, different colors are used to show the forward correlation and backward correlation.

For example, consider a business model—application A that impacts another business model—business process x. In forward inferring (also referred to as inferring), when the user clicks A, then x will be highlighted. In backward inferring, if another application B also has impact on x, then B will be highlighted too when the user clicks A. Both forward inferring and backward inferring are used in daisy chain analysis. Inferring is useful for what-if analysis. Backward inferring is useful in how-to analysis. For example, if one wants to improve business process x through upgrade of application A, one may need to know whether application B or other applications impact business process x too.

The above-described user interfaces and visualization can be implemented in any modem programming languages (e.g., Java, C++, Visual Basic, etc.) and development environments (e.g., Eclipse, MS Visual Studio, etc.), which provide graphical editing modules (e.g., GEF—Graphical Editing Framework for Eclipse).

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for inferring and visualizing correlations of different business aspects for business transformation, comprising:
   loading into memory a plurality of business models, said a plurality of business models including at least business component model, business process model, value drivers and metrics model, application model, organization model, and solutions model;
   selecting a model topology, the model topology representing data schema for connecting said a plurality of business models;
   configuring one or more qualitative relationships between one or more entities in said business models;
   configuring one or more quantitative properties of said one or more entities in said business models based on said configured one or more qualitative relationships;
   inferring, by a processor, one or more qualitative correlations from the said qualitative relationships among said one or more entities in said business models, the step of inferring utilizing one or more logical rules;
   determining quantitative correlations from said quantitative properties of said one or more entities, said determining utilizing statistics, data mining, mathematical models, simulations, or optimizations, or combinations thereof, said quantitative correlations including distance, intensity determined from a formula that incorporates values of said one or more entities that are correlated, and direction representing forward or backward inferring, said quantitative correlations including coefficient measure between the elements of said entities in said business models, said coefficient measure providing pattern of relationship between the elements of said entities in said business models; and
   generating visualization of said qualitative correlations and quantitative correlations.

2. The method of claim 1, wherein said model topology includes star topology, loop topology, line topology, or tree topology.

3. The method of claim 1, wherein said logical rules include transitivity, ontology, or semantics or combinations thereof.

4. The method of claim 1, wherein said logical rules include user defined rules.

5. The method of claim 1, wherein said visualization includes color coding said qualitative correlations and quantitative correlations, using different intensities of color to represent said qualitative correlations and quantitative correlations, using different colors to show positive or negative correlations, or using same or different colors to show direction of correlations, or combinations thereof.

6. The method of claim 1, wherein the step of selecting a model topology includes receiving a user selected model topology.

7. The method of claim 1, wherein the step of configuring one or more qualitative relationships includes receiving user mapping of entities in said business models.

8. The method of claim 1, wherein the step of configuring one or more qualitative relationships includes receiving user mappings between entities in a source business model and a target business model.

9. The method of claim 1, wherein the step of configuring one or more qualitative relationships includes receiving user mappings between entities in a source business model and a target business model, wherein the target business model includes the business process model.

10. The method of claim 1, wherein the step of configuring one or more qualitative relationships includes receiving user mappings between entities in a user selected source business model and a target business model.

11. The method of claim 1, wherein the step of configuring one or more qualitative relationships includes receiving user mappings between entities in a user selected source business model and a target business model, the target business model being the business process model.

12. The method of claim 1, wherein the step of inferring includes forward inferring.

13. The method of claim 1, wherein the step of inferring includes backward inferring.

14. The method of claim 1, wherein the step of inferring includes inferring direct and indirect relationships between said one or more entities in said business models.

15. The method of claim 1, further including generating a report based on said qualitative correlations and said quantitative correlations.

16. A method for inferring and visualizing correlations of different business aspects for business transformation, comprising:
   providing a computer-implemented module operable to load into memory a plurality of business models, said plurality of business models including at least business component model, business process model, value drivers and metrics model, application model, organization model, and solutions model, the plurality of business models structured using a model topology, the model topology representing data schema for connecting said plurality of business models;
   providing a computer-implemented user-interface module operable to configure one or more qualitative relationships between one or more entities in said business models, the user-interface module further operable to configure one or more quantitative properties of said one or more entities in said business models based on said configured one or more qualitative relationships;
   providing a computer-implemented inference engine, executing on a processor, operable to infer one or more qualitative correlations from the said qualitative relationships among said one or more entities in said business models, the inference engine utilizing one or more logical rules;
   providing a computer-implemented module operable to determine quantitative correlations from said quantitative properties of said one or more entities, utilizing statistics, data mining, mathematical models, simulations, or optimizations, or combinations thereof, said quantitative correlations including distance, intensity determined from a formula that incorporates values of said one or more entities that are correlated, and direction representing forward or backward inferring, said quantitative correlations including coefficient measure between the elements of said entities in said business models, said coefficient measure providing pattern of relationship between the elements of said entities in said business models; and providing a computer-implemented visualization module operable to generate visualization of said qualitative correlations and quantitative correlations.

17. The method of claim 16, wherein the user-interface module allows a user to create, edit, or remove the qualitative relationships.

18. The method of claim 16, wherein the inference engine is further operable to infer backwards or forwards or combinations thereof.

19. The method of claim 16, wherein the inference engine is further operable to infer indirect relationships.

20. The method of claim 16, wherein the logical rules include transitivity, ontology, or semantics or combinations thereof.

21. The method of claim 16, wherein the logical rules include user defined rules.

22. The method of claim 16, wherein the user-interface module allows a user to select the model topology.

23. The method of claim 16, wherein the model topology includes star topology, loop topology, line topology, or tree topology.

24. The method of claim 16, wherein the user-interface module allows a user to map one or more entities in said business models.

25. The method of claim 16, wherein the user-interface module allows a user to map one or more entities between a source business model and a target business model, wherein the target business model includes the business process model.

26. The method of claim 16, wherein the visualization module further generates one or more reports based on the qualitative correlations and quantitative correlations.

27. A system for inferring and visualizing correlations of different business aspects for business transformation, comprising:

a processor;

a memory module operable to store a plurality of business models, said plurality of business models including at least business component model, business process model, value drivers and metrics model, application model, organization model, and solutions model, the plurality of business models structured using a model topology, the model topology representing data schema for connecting said plurality of business models;

a computer-implemented user-interface module operable to configure one or more qualitative relationships between one or more entities in said business models, the user-interface module further operable to configure one or more quantitative properties of said one or more entities in said business models based on said configured one or more qualitative relationships;

a computer-implemented inference engine, executing on the processor, operable to infer one or more qualitative correlations from the said qualitative relationships among said one or more entities in said business models, the inference engine utilizing one or more logical rules;

a computer-implemented module operable to determine quantitative correlations from said quantitative properties of said one or more entities, utilizing statistics, data mining, mathematical models, simulations, or optimizations, or combinations thereof, said quantitative correlations including distance, intensity determined from a formula that incorporates values of said one or more entities that are correlated, and direction representing forward or backward inferring, said quantitative correlations including coefficient measure between the elements of said entities in said business models, said coefficient measure providing pattern of relationship between the elements of said entities in said business models; and a computer-implemented visualization module operable to generate visualization of said qualitative correlations and quantitative correlations.

28. The system of claim 27, wherein the visualization module is further operable to generate one or more reports based on said qualitative correlations and quantitative correlations.

29. The system of claim 27, wherein the user-interface module allows a user to map one or more entities between a source business model and a target business model, wherein the target business model includes the business process model.

30. The system of claim 27, wherein the user-interface module allows a user to create, edit, or remove the qualitative relationships.

31. The system of claim 27, wherein the inference engine is further operable to infer backwards or forwards or combinations thereof.

32. The system of claim 27, wherein the inference engine is further operable to infer indirect relationships.

33. The system of claim 27, wherein the logical rules include transitivity, ontology, or semantics, or user defined rules or combinations thereof.

34. A program storage device readable by a machine, tangibly embodying a program of instructions executable by the machine to perform a method of inferring and visualizing correlations of different business aspects for business transformation, comprising:

loading into memory a plurality of business models, said plurality of business models including at least business component model, business process model, value drivers and metrics model, application model, organization model, and solutions model;

selecting a model topology, the model topology representing data schema for connecting said a plurality of business models;

configuring one or more qualitative relationships between one or more entities in said business models;

configuring one or more quantitative properties of said one or more entities in said business models based on said configured one or more qualitative relationships;

inferring one or more qualitative correlations from the said qualitative relationships among said one or more entities in said business models, the step of inferring utilizing one or more logical rules;

determining quantitative correlations from said quantitative properties of said one or more entities, said determining utilizing statistics, data mining, mathematical models, simulations, or optimizations, or combinations thereof, said quantitative correlations including distance, intensity determined from a formula that incorporates values of said one or more entities that are correlated, and direction representing forward or backward inferring, said quantitative correlations including coefficient measure between the elements of said entities in said business models, said coefficient measure providing pattern of relationship between the elements of said entities in said business models; and generating visualization of said qualitative correlations and quantitative correlations.

35. The program storage device of claim 34, wherein the inference engine is further operable to infer backwards or forwards or combinations thereof.

* * * * *